United States Patent
Aratani et al.

(10) Patent No.: US 7,260,828 B2
(45) Date of Patent: Aug. 21, 2007

(54) DATA PROCESSING APPARATUS, AND DATA PROCESSING METHOD

(75) Inventors: Shuntaro Aratani, Tokyo (JP); Tomoyuki Ohno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1154 days.

(21) Appl. No.: 09/921,698

(22) Filed: Aug. 6, 2001

(65) Prior Publication Data

US 2002/0019982 A1 Feb. 14, 2002

(30) Foreign Application Priority Data

Aug. 10, 2000 (JP) .............................. 2000-242838

(51) Int. Cl.
*H04N 7/16* (2006.01)
(52) U.S. Cl. ...................... 725/141; 725/133; 725/153; 725/48; 725/50; 725/59
(58) Field of Classification Search ............ 725/37–61, 725/135, 141, 153, 133; 708/173
See application file for complete search history.

(56) References Cited

U.S. PATENT DOCUMENTS 4,787,063 A * 11/1988 Muguet .................... 386/83
6,072,483 A * 6/2000 Rosin et al. ............... 715/716
6,591,421 B1 * 7/2003 Sullivan ..................... 725/50
2004/0194124 A1 * 9/2004 Medvinsky ................. 725/25

OTHER PUBLICATIONS

U.S. Appl. No. 09/510,340, filed Feb. 22, 2000.
U.S. Appl. No. 09/506,939, filed Feb. 18, 2000.
U.S. Appl. No. 09/694,504, filed Oct. 24, 2000.
U.S. Appl. No. 09/537,872, filed Mar. 29, 2000.

* cited by examiner

*Primary Examiner*—Jason Salce
(74) *Attorney, Agent, or Firm*—Fitzpatrick, Cella, Harper & Scinto

(57) ABSTRACT

A data processing apparatus comprises a processing unit, for performing processes related to multiple functions, an allocation unit, for allocating, to the multiple processes, different codes for performing the multiple processes, and a control unit, for controlling the processing unit to perform the processes in accordance with codes allocated by the allocation unit, wherein the allocation unit allocates a predetermined code for a specific process of the multiple processes, and allocates a code, other than the predetermined code, for processes other than the specific process.

12 Claims, 12 Drawing Sheets

| | | | | |
|---|---|---|---|---|
| 0: | 00: | 10: TV BUG | | 000: |
| 1: TV NHH | 01: | 11: TV ELV | 22: DIGITAL PHOTOGRAPH | 111: |
| 2: TV AAA | 02: | 12: TV TWL | | 222: |
| 3: TV ABA | 03: | 13: TV THR | 33: MAIL RECEPTION | 333: |
| 4: TV CBO | 04: | 14: | 44: | 444: |
| 5: | 05: | 15: TV ZGZ | 55: | 555: |
| 6: TV NBC | 06: | 16: | 66: | 666: |
| 7: TV NKK | 07: | 17: TV HBO | 77: | 777: |
| 8: TV FOX | 08: | 18: | 88: | 888: |
| 9: TV CAT | 09: | 19: TV CNN | 99: CODE RESERVATION | 999: CODE RESERVATION |

FIG. 10

| PRINTING TITLE ||||
|---|---|---|---|
| PROGRAM A ch6<br>THIS PROGRAM<br>IS ××××<br>code: 21<br>(RESERVATION) | PROGRAM C ch3<br>THIS PROGRAM<br>IS ××××<br>code: 23<br>(RESERVATION) | PROGRAM E ch10<br>THIS PROGRAM<br>IS ××××<br>code: 24<br>(RESERVATION) | PROGRAM H ch1<br>THIS PROGRAM<br>IS ××××<br>code: 25<br>(RESERVATION) |
| PROGRAM J ch15<br>THIS PROGRAM<br>IS ××××<br>code: 26<br>(RESERVATION) | PROGRAM R ch6<br>THIS PROGRAM<br>IS ××××<br>code: 27<br>(RESERVATION) | PROGRAM X ch8<br>THIS PROGRAM<br>IS ××××<br>code: 28<br>(RESERVATION) | PROGRAM Y ch1<br>THIS PROGRAM<br>IS ××××<br>code: 29<br>(RESERVATION) |

| BROWSER<br>http://www.xyz.<br>code: 66 | MAIL<br>RECEPTION<br>code: 33 | CODE<br>RESERVATION<br>code: 88 | DIGITAL<br>PHOTOGRAPH<br>code: 22 | VTR<br>code: 55 |
|---|---|---|---|---|

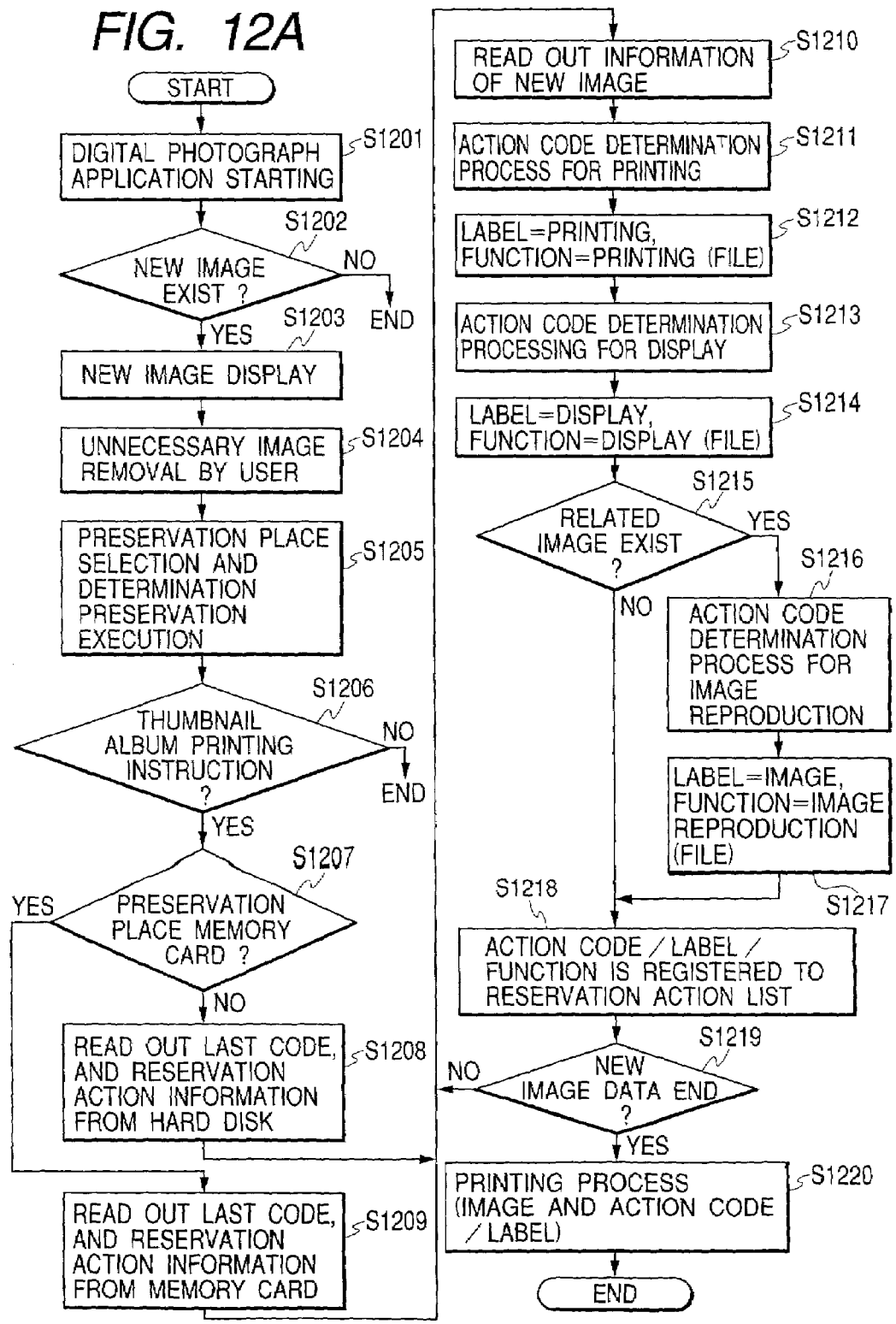

DATA PROCESSING APPARATUS, AND DATA PROCESSING METHOD

BACKGROUND OF THE INVENTION

1. Field of the Invention

The present invention relates to a data processing apparatus, and relates in particular to a data processing apparatus that can execute multiple processes.

2. Related Background Art

Digital satellite TV broadcasting using communication satellites (CSs), and digital satellite TV broadcasting using broadcast satellites (BSs), both of which are currently employed, combined with ground-wave digital TV broadcasting, deployment of which is presently in the planning stage, will expand available broadcast capacities to several tens to hundreds of channels and will permit the airing of a great number of programs, thereby making it difficult for users to search out and select those they desire to view.

Therefore, on a digital TV broadcast receiving apparatus, a program guide, contents based on received electronic program guide (EPG) data, is displayed that a user can employ to locate a program he or she desires to view and to automatically designate a source station and use a timer for setting up a connection. Further, based on a designated search condition, if a user performs a search of EPG data for, or registers, a favorite, desired program, that program will be located for the user.

Further, as portions of the communication infrastructure, such as the Internet, have been expanded, and since there has been an increase in the frequency of browsing requests handled by the WWW (World Wide Web) and in the exchange of e-mail originating at the homes of correspondents, television sets with integrated WWW browsing software (browsers) and STBs (Set Top Boxes) that include e-mail applications have become available, and TV broadcast receiving apparatuses having a variety of functions, in addition to the screening of programs for visual entertainment, have been developed.

However, when an EPG screen is used to select, to reserve or to search for a program, or when a WWW browsing function, a data broadcasting browsing function, or an e-mail application function is employed, an EPG screen or an operating screen for one of the additional functions must be displayed, and complicated operations, such as screen switching and scrolling, must be performed using a cursor key or a determination key. Persons who have operated only conventional television receiving apparatuses and who are not familiar with computer use or with playing video games find such operations very difficult.

In addition, since many areas, spread across an entire screen, are used for an EPG operation and for operating screens for functions, these screens interfere with the viewing of a program that is being shown.

Special buttons that correspond to individual functions and that eliminate the need to manipulate cursor keys may be provided for remote controllers; but for multi-functioned TV broadcast receiving apparatuses, too many such buttons must be provided, so that users can neither remember the functions of all the buttons, nor use them easily.

SUMMARY OF THE INVENTION

To resolve these shortcomings, it is one objective of the present invention to provide an apparatus having multiple functions that permits a user to easily and accurately execute an operation corresponding to each function.

It is another objective of the present invention to provide a digital TV broadcast receiving apparatus having various functions that permits a user to accurately and easily execute an operation corresponding to each function, without interfering with the viewing of a program.

To achieve the objectives, according to one aspect of the present invention, a data processing apparatus comprises:

processing means for performing processes corresponding to multiple functions;

allocation means for allocating different codes for the processes for performing the multiple functions; and control means for controlling the processing means for performing the processes in accordance with the codes allocated by the allocation means, wherein the allocation means allocates a predetermined code for a specific process of the multiple processes, and allocates codes other than the predetermined code for processes other than the specific process.

The other objectives and features of the present invention will become apparent during a detailed explanation given for the preferred embodiments while referring to the accompanying drawings.

BRIEF DESCRIPTION OF THE DRAWINGS

FIG. 10 is a diagram showing an example display for an action code list;

FIGS. 12A and 12B are flowcharts showing the processing performed by the system controller when an action code is allocated for an image picked up by a digital photo application, and that performed when printing is initiated.

DETAILED DESCRIPTION OF THE PREFERRED EMBODIMENTS

The preferred embodiments of the present invention will now be described in detail while referring to the accompanying drawings.

Figure 1:
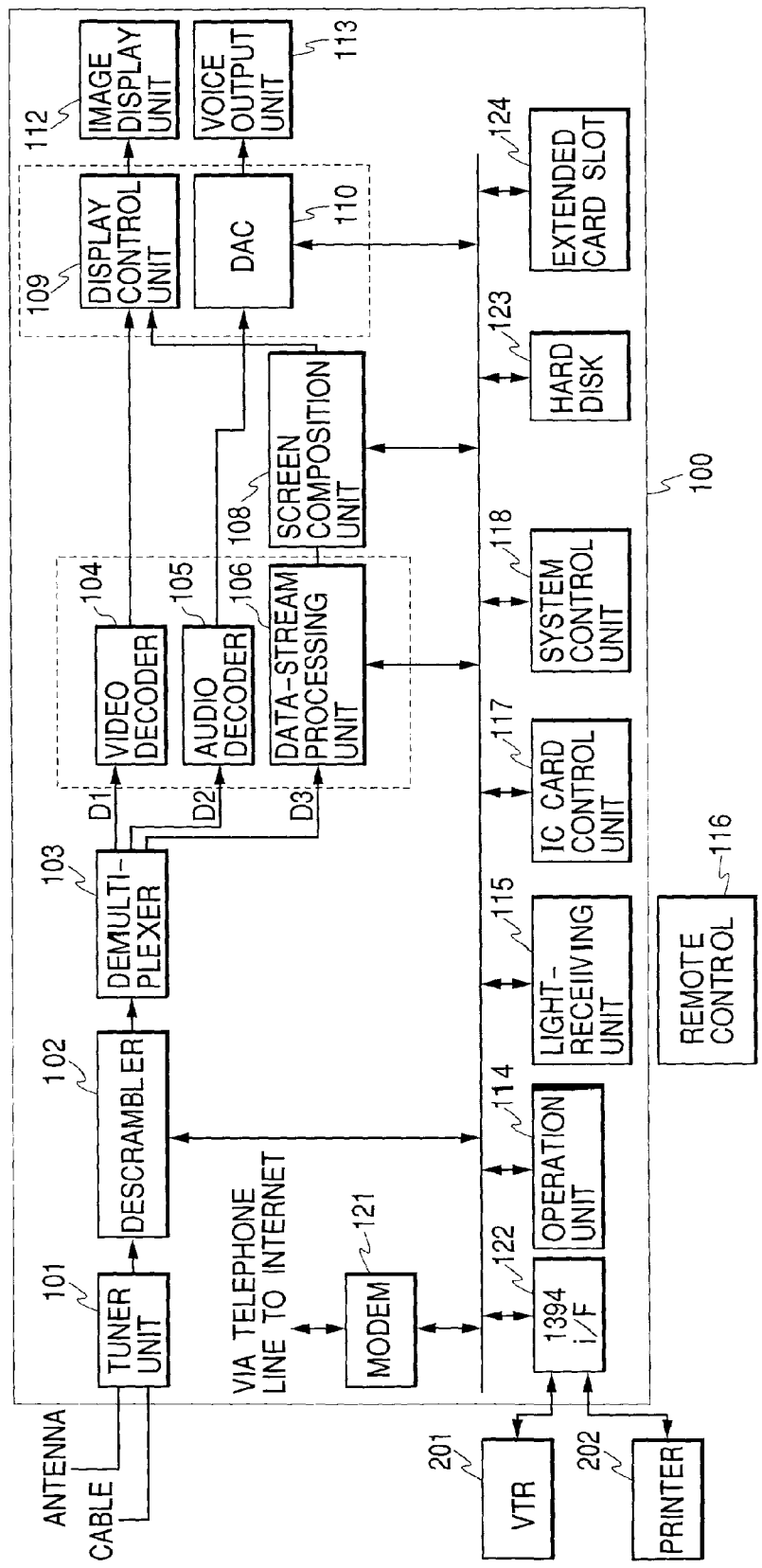
FIG. 1 is a block diagram showing the configuration of a digital TV broadcast receiving apparatus according to a first embodiment of the present invention.

Initially, a first embodiment of the invention will be described. FIG. 1 is a diagram showing the configuration of a digital TV broadcast receiving apparatus 100 according to the present invention.

In FIG. 1, a signal received at an antenna (not shown) is transmitted to a tuner unit 101. The tuner unit 101 performs demodulation or error correction for the received signal, generates digital data in a form called a transport stream, and outputs the transport stream (TS) to a descrambler 102.

When the descrambler 102 receives, from the tuner unit 101, the TS data that is scrambled to restrict audio access, the descrambler 102 performs descrambling based on key data that are included with the TS data and that are provided for descrambling, and key data that are output by an IC card control unit 117, and outputs the resultant data to a demultiplexer 103.

The IC card control unit 117 includes an IC card in which contract data for a user are stored and key data for descrambling that are included with the TS data. When key data are available for resolving key data provided for descrambling that are received from the descrambler 102, the pertinent key data are output to the descrambler 102.

When the descrambler 102 receives, from the tuner unit 101, TS data that are not scrambled, the descrambler 102 outputs the TS data to the multiplexer 103 unchanged.

Of the TS data that are received from the descrambler 102 and that are obtained by multiplexing time series video and audio data, EPG data and data broadcasting data for multiple channels, the demultiplexer 103 extracts video data D1 and audio data D2, which are related to a program that is currently being broadcast over a channel selected by manipulating an operation unit 114 or a remote control unit 116. Then, the demultiplexer 103 outputs the video data D1 and the audio data D2 to a video decoder 104 and an audio decoder 105. The data used for data broadcasting are the data that are multiplexed with the video and audio data of a program to obtain TS data for transmission, and includes text data, script data, image data and video/audio data.

The demultiplexer 103 extracts data broadcasting/EPG data D3 from the TS data, and outputs them to a data-stream processing unit 106 and also to a hard disk 123, via a bus 120.

The hard disk 123 is used to store data broadcasting data or EPG data received from the demultiplexer 103. A system control unit 118 compares version data that are added to the received data broadcasting data or EPG data with version data for the data stored on the hard disk 123, and controls the demultiplexer 103 to constantly update data to be stored on the hard disk 123.

The TS data are transmitted by the packet unit, and the PID (Packet Identification) is added at the head of a packet. The demultiplexer 103 reads this PID to identify the video data D1, the audio data D2 or the data broadcasting/EPG data D3.

First, the video data will be described. The video decoder 104 performs MPEG2 decoding for the video data D1 received from the demultiplexer 103, and outputs the decoded video data to a display control unit 109. The display control unit 109 switches screens or multiplexes screens in accordance with the manipulation of the operation unit 114 or the remote control unit 116, and displays, on an image display unit 112, the video data received from the video decoder 104 or a screen composition unit 108, which will be described later. The image display unit 112 includes a monitor and a video signal input terminal (neither of them shown).

The audio data will now be explained. An audio decoder 105 performs MPEG2 decoding for the audio data D2 received from the demultiplexer 103, and outputs the decoded audio data to a DAC 110. The DAC 110 performs D/A conversion for the audio data received from the audio decoder 105 and outputs the obtained data to a voice output unit 113, which includes a loudspeaker and an audio signal input terminal (neither of them shown).

The data broadcasting/EPG data D3 will now be described. Electronic program guide (EPG) data are transmitted with a data structure that is defined by, for example, standards for the "program exhibition information used for digital broadcasting" established by the corporation "Associated Radio Industry Board (ARIB)". The primary data constituent is an SDT (Service Description Table) for transmitting information concerning a programming channel, such as the name of the programming channel and the name of a broadcasting enterprise; a BAT (Bouquet Association Table) for transmitting information about a bouquet (a set of programming channels), such as the name of the bouquet and the included programming channels; an EIT (Event Information Table) for transmitting information related to a program, such as the name of a program, a broadcasting start date and an explanation of the program contents; or a TDT (Time Data Table) for transmitting information for the current date and time.

The data broadcasting data are repetitively output by a broadcasting station using a DSM-CC data carousel method defined in ISO/IEC13818-6, and are received by the data-stream processing unit 106, as previously described. The text data included in the data broadcasting data are written in XML (extensible Markup Language), defined by W3C.

When the operation unit 114 or the remote control unit 116 is manipulated to display a data broadcasting screen and an EPG screen, a screen display instruction is issued to the system control unit 118 by the operation unit 114, or by the remote control unit 116 received at a light-receiving unit 115.

Upon the reception of the screen display instruction from the operation unit 114 or the light-receiving unit 115, the system control unit 118 executes control software, which will be described later, to read from the hard disk 123 necessary information contained in the data broadcasting data or the EPG data, and outputs the obtained data to the data-stream processing unit 106.

The data-stream processing unit 106 decodes the received data broadcasting/EPG data, and outputs, to the screen composition unit 108, the decoded EPG data, consisting of text data and image data, or the decoded data broadcasting data, consisting of text data, image data and video/audio data.

Based on the data broadcasting/EPG data received from the data-stream processing unit 106, the screen composition unit 108 outputs, to the display control unit 109, a character signal in order to compose the data broadcasting screen or the EPG screen. The display controller 109 thereafter outputs a video signal to the image display unit 112 in order to switch among the video screen, the data broadcasting screen and the EPG screen, as previously described.

Further, in accordance with the manipulation of the operation unit 114 or the remote control unit 116, the screen composition unit 108 prepares a screen for supporting the user's operation, and outputs it to the display control unit 109.

As is shown in FIG. 1, the individual blocks are connected to the common bus 120. An IEEE1394 interface 122 and a modem 121 are also connected to the bus 120, and the IEEE1394 interface 122 is used in accordance with the communication protocol to communicate with a VTR 201 or a printer 202, which are externally connected to the digital TV broadcast receiving apparatus 100.

The AV/C protocol is used for communication with the VTR 201, and in accordance with this protocol, mainly control commands, such as "replay", "stop" and "record", are transmitted by the digital TV broadcast receiving apparatus 100 to the VTR 201.

The SBP (Serial Bus Protocol) is used for communication with the printer 202, and in accordance with this protocol, mainly print data are transmitted by the digital TV broadcast receiving apparatus 100 to the printer 202.

The modem 121 is used to establish a connection with the Internet via a public line, or for the transmission of client data to a broadcasting station.

The digital TV broadcast receiving apparatus 100 also includes an extended card slot 124, into which is inserted a removable memory card for the exchange of data.

Figure 2:
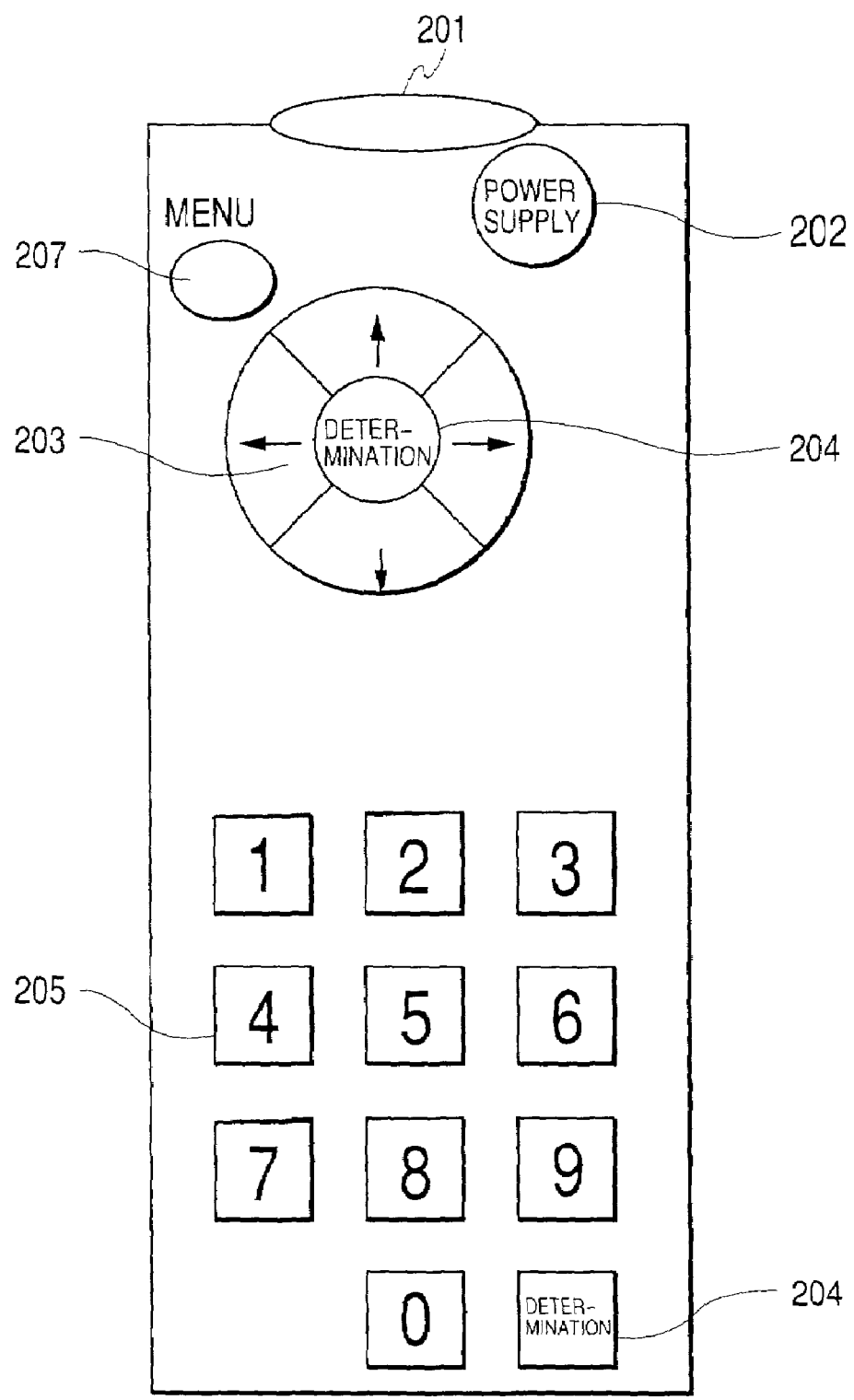
FIG. 2 is a diagram showing an example remote controller in FIG. 1.

An example remote control unit 116 is shown in FIG. 2. It should be noted, however, that in this example the only buttons shown are those provided for the functions employed for the explanation of the embodiment, and that the operation buttons provided for an actual receiving apparatus are not limited to the ones shown.

Further, in addition to the remote control unit 116 in FIG. 2, a pointing device, such as a mouse, may be employed.

In FIG. 2, a light-emitting unit 201 is used to provide infrared communication between the remote control unit 116 and the light-receiving unit 115 in FIG. 1. A power key 202 is used to turn on or off the remote control unit 116. A cursor key 203 is used to move a cursor vertically or horizontally. Decision buttons 204 are used to determine an area designated by the cursor, and to establish the use of a ten key pad 205 for an entry. The ten key pad 205 is used to enter a channel number, and a menu button 207 is used to display a menu screen.

Both the decision buttons 204, which are respectively provided near the cursor key 203 and near the ten key pad 205, have the same function.

The system control unit 18 includes a ROM used to store the control software, a RAM used as a work memory and a CPU for executing the control software. In accordance with the manipulation of the operation unit 114 or the remote control unit 116, the system control unit 18 controls the tuner 101, the descrambler 102, the demultiplexer 103, the decoder 104, the data-stream processing unit 106, the screen composition unit 108, the display controller 109, and the DAC 110.

Figure 3:
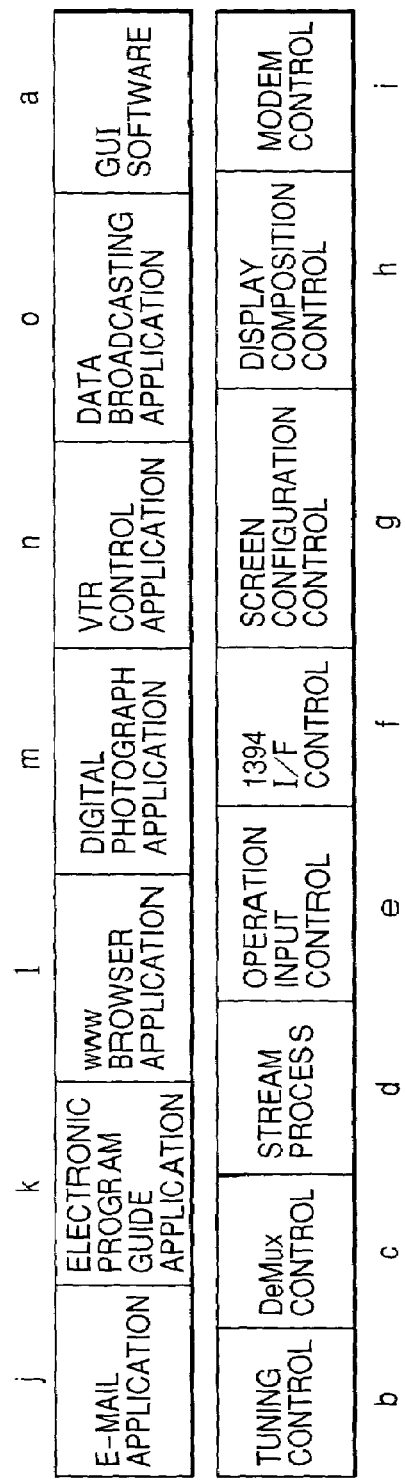
FIG. 3 is a diagram showing the control software configuration for a system controller.

FIG. 3 is a diagram showing the configuration of the control software in the system control unit 118. In FIG. 3, GUI software (a) is the nucleus of a user interface control process in this embodiment. While control software (b) and (i) are interface software (driver software) for controlling the individual processing circuits in FIG. 1.

An e-mail application (j) controls the modem 121, via the modem control driver (i), and is connected to an Internet provider for exchanging e-mail with an email server.

An electronic program guide application (k) displays, as is described above, a television program table (EPG screen) based on the EPG data in accordance with the operation unit 114 and the remote control unit 116, and supports a user's channel or program reservation.

A WWW browser application (l) is connected, via the modem 121, to the Internet to receive text and data written in HTML or XML and to display information, such as a homepage.

A digital photograph application (m) reads image data or moving picture data from a memory card inserted into the extended card slot 124, and to edit, print and display images.

A VTR control application (n) displays an operation panel to operate the VTR 201, connected via the IEEE1394 interface 122, and transmits a corresponding AV/C command to the VTR 201 via the IEEE1394 interface 122 by manipulating the operation unit 114 and the remote controller 116, and controls the VTR 201 using the operation panel.

Figure 4:
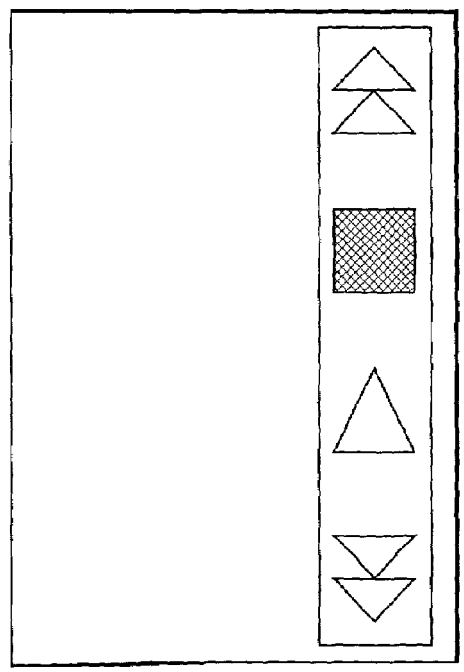
FIG. 4 is a diagram showing an example display of an operating panel for operating a VTR.

FIG. 4 is a diagram showing an example display for the operation panel used to operate the VTR 201. Four buttons "replay", "stop", "rewind" and "fast forward" are displayed, and when, for example, the cursor is moved by using the operation unit 114 or the remote control unit 116 to determine a replay button, the AV/C command "PLAY" is transmitted to the VTR 201.

In FIG. 3 a data broadcasting application (o) displays a data broadcasting screen based on data broadcasting data in accordance with the manipulation of the operation unit 114 or the remote controller 116, as previously described.

The applications (j) and (o) are performed by selecting and determining the entry on a menu screen that is displayed by depressing the menu button 207 on the remote control unit 116. The menu entries, such as "e-mail", "electronic program guide", "WWW" browser", "digital photograph", "data broadcasting", "VTR", "action code reservation", and "initial setting" are displayed on the menu screen.

The operation of the system control unit 118 will now be described in detail.

First, an explanation will be given for the operation of the system control unit 118 at the initial setting for the digital TV broadcast receiving apparatus 100. When the "initial setting" is selected and determined on the menu screen (not shown) by the operation unit 114 or the remote control unit 116, an action code allocation process is initiated in response to an operation performed for the selection of an audible channel, which will be described later.

At the initial setting, a search for an audio available channel is performed by the digital TV broadcast receiving apparatus 100, and is registered in a reservation action list that will be described later. The system control unit 118 controls the tuner unit 101 to sequentially tune the TS data, issues an inquiry to the descrambler 102, and searches for an audio available channel number based on the current contact contents for the user.

When the same number as the obtained channel number is allocated as the action code in response to the selection of the audio available channel, it, in addition, is registered in the reservation action list, which will be described later, that is stored on the hard disk 123 together with the action label (TV NHH, etc.) and the action function (TV(ch1), etc.), which is a program function executed by the system control unit 118 when the action code is input. It should be noted that a channel number and a transmission stream ID are set as the arguments for the action function.

Further, as will be described later, the screen composition unit 108 is controlled, so that a screen for setting the number of digits for non-reservation code is displayed in order to designate the number of action code to be allocated for a non-reservation action during the action code printing process. Then, the number of digits to be allocated for the action code that is designated for the non-reservation code digit count setting screen is written to the hard disk 123.

The number of digits of the code to be allocated for the non-reservation action can be set for each of multiple users. For example, the number of digits can be designated as two for a user who employs a minimum number of required functions and watches a limited number of programs, or four for a user who employs a variety of functions and watches many programs.

The reservation action and the registration process performed for it will now be described. The reservation action is one by which a number that a user can easily remember or a number corresponding to a channel number is allocated as an action code. The action code and this process are registered in the reservation action list and are not changed so long as a registration change process is not performed.

Numbers that a user can easily remember are set in advance as initial reservation codes, and one of the initial reservation codes is allocated for a reservation action. The numbers set as the initial reservation codes are 09, 00, 10, 11, 22, 33, . . . 99, 111, 222, 333, . . . and 999.

A channel selection action for an audio available channel is allocated as one of the numbers that correspond to each channel number.

Figure 5:
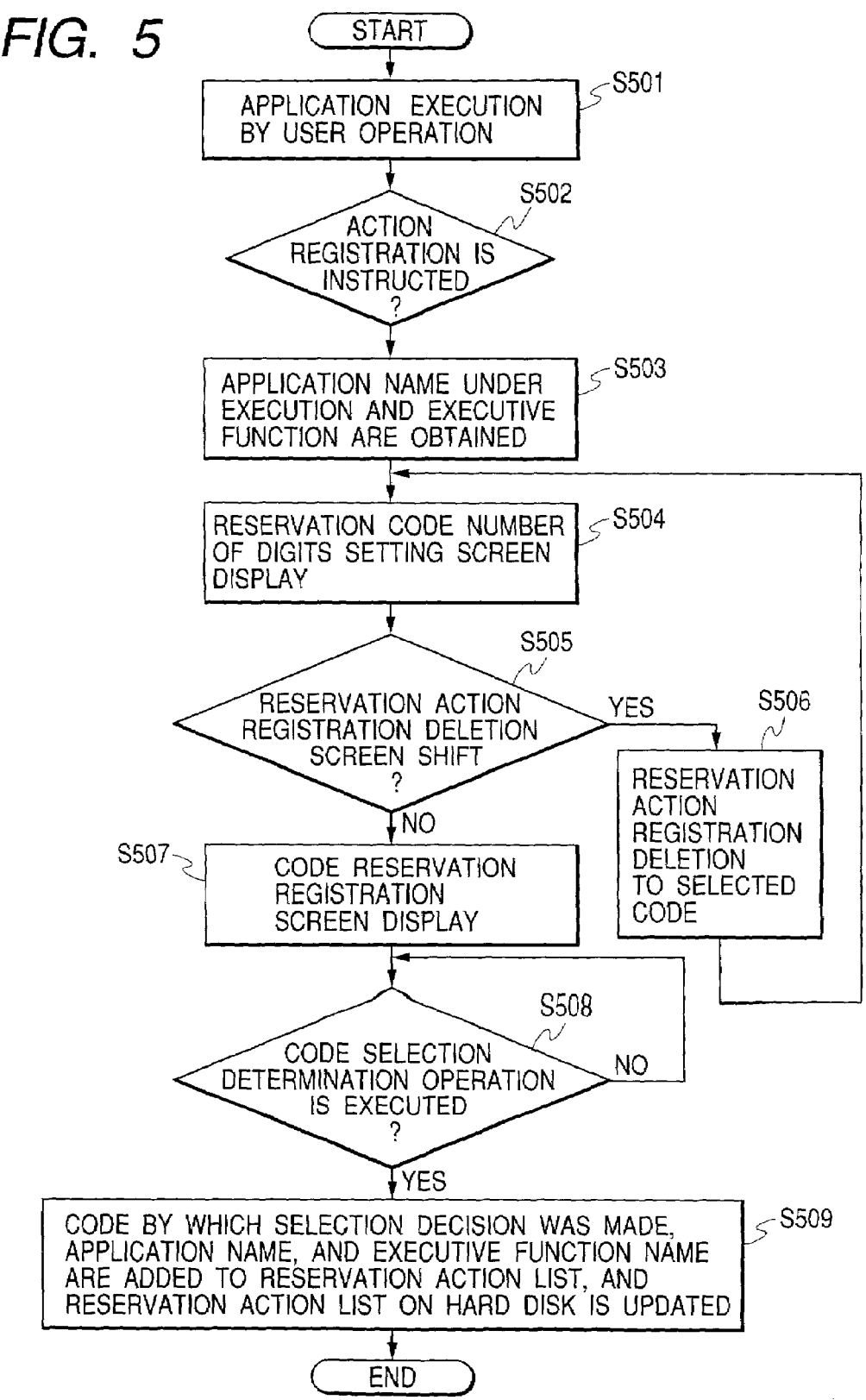
FIG. 5 is a flowchart showing the processing performed by the system controller when an action code is registered for a reservation action.

FIG. 5 is a flowchart showing the processing performed by the system control unit 118 upon the registration of an action code (the registration of an action code for a reservation action).

At S501, a check is initiated to determine whether an action code registration instruction has been issued during the above described application (S502). When an action code registration instruction has been issued, program control advances to S503.

The action code registration instruction can be issued either by selecting "action code reservation" on the menu screen that is displayed upon the depression of the menu button 207, or by using the ten key pad 205 of the remote control unit 116 to enter "99" or "999" and depressing the decision button 204. The action code entry operation will be described later.

At S503, the function (or the argument) for calling an application that is currently being executed is read from the ROM of the system control unit 118, and is temporarily stored as the action function in the RAM of the system control unit 118. Further, the name of the application that is currently being executed and the screen mode parameter on the display are read, and are temporarily stored as an action label in the RAM of the system control unit 118.

For example, when a user is executing the mail application and displaying the screen for the display of received mail, the action function=mail (received) and the action label="mail received".

Further, when the user is executing the WWW browser, the action function=browser (http://www.xyz.com), and the action label="browser" (http://www.xyz.com).

At S504, the reservation code digit count setting screen (not shown) is displayed to set the number of digits for the code, and the user selects the number of digits, one to four. The reservation action list is read from the hard disk 123, and, when on the reservation action list, the reservation action is registered for all the initial registration codes having the number of digits selected at S504, a message is displayed indicating the allocation is impossible for that digit count, and an inquiry is displayed to determine whether the screen should be moved to the registration action registration delete screen (not shown).

At S505, a check is performed to determine whether an instruction has been issued to move to the reservation action registration delete screen. When this instruction has been issued, the reservation action registration for the code selected on that screen is deleted (S506) and program control returns to S504. The reservation action list is again displayed on the reservation action registration delete screen and the user can make another code selection.

Figures 6, 7:
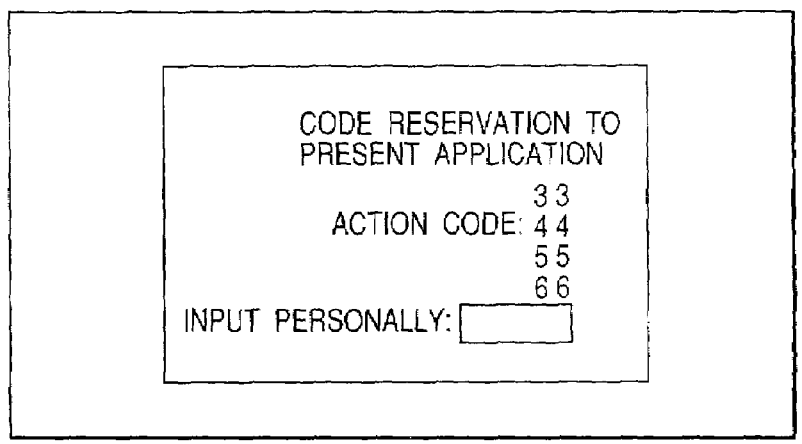
FIG. 6 is a diagram showing an example display for a code reservation registration screen.
FIG. 7 is a diagram showing an example reservation action list.

When, at S505, the screen is not shifted to the reservation action registration delete screen, the reservation action list read from the hard disk 123 at S504 is referred to in order to identify the initial reservation code that has the number of digits set at S504 and for which the reservation action has not been registered. Then, on the code reservation registration screen, the code is displayed as a code choice to be allocated, as is shown in FIG. 6 (S507).

In addition, on the code registration reservation screen, not only is the code choice to be allocated displayed but also the code input column, so that a user can enter an arbitrary number to set a code.

At S508, a check is performed to determine whether, through the manipulation of the remote control unit 116 by a user, a desired code can be selected from among the allocated code choices on the code reservation registration screen, or an operation can be performed for manually inputting a code to determine the code to be allocated. When the code determination process is performed, program control advances to S509.

At S509, the action function and the action label, which are temporarily stored in the RAM for the system control unit 118, are read and are added to the reservation action list in correlation with the action code that is determined at S508. Then, the reservation action list that is stored on the hard disk 123 is updated.

It should be noted that a user can issue an action code registration instruction while watching a program. In this case, the code is selected and determined not by the number corresponding to the channel number, but on the screen as is shown in FIG. 6. Thereafter, the information for selecting the current program is read from the RAM of the system control unit 118, and the action label is registered, with the action information, in the reservation action list.

FIG. 7 is a diagram showing an example reservation action list. The action codes on the reservation action list include, as previously described, the initial reservation code, the code corresponding to an audio available channel number, and a code manually input by a user and added to the reservation action list, and are registered in correlation with the action function and the action label. It should be noted that, in FIG. 7, action codes of one to three digits are shown and there is no action function.

An action for registering a reservation action, such as "code reservation", is allocated in advance to action codes 99 and 999.

An explanation will now be given for a process for allocating an action code to a non-reservation action rather than the reservation action. A non-reservation action is an action that is not registered in the above described reservation action list, and for which a new action code is allocated each time the action code allocation process, which will be described later, is performed.

Figure 8:
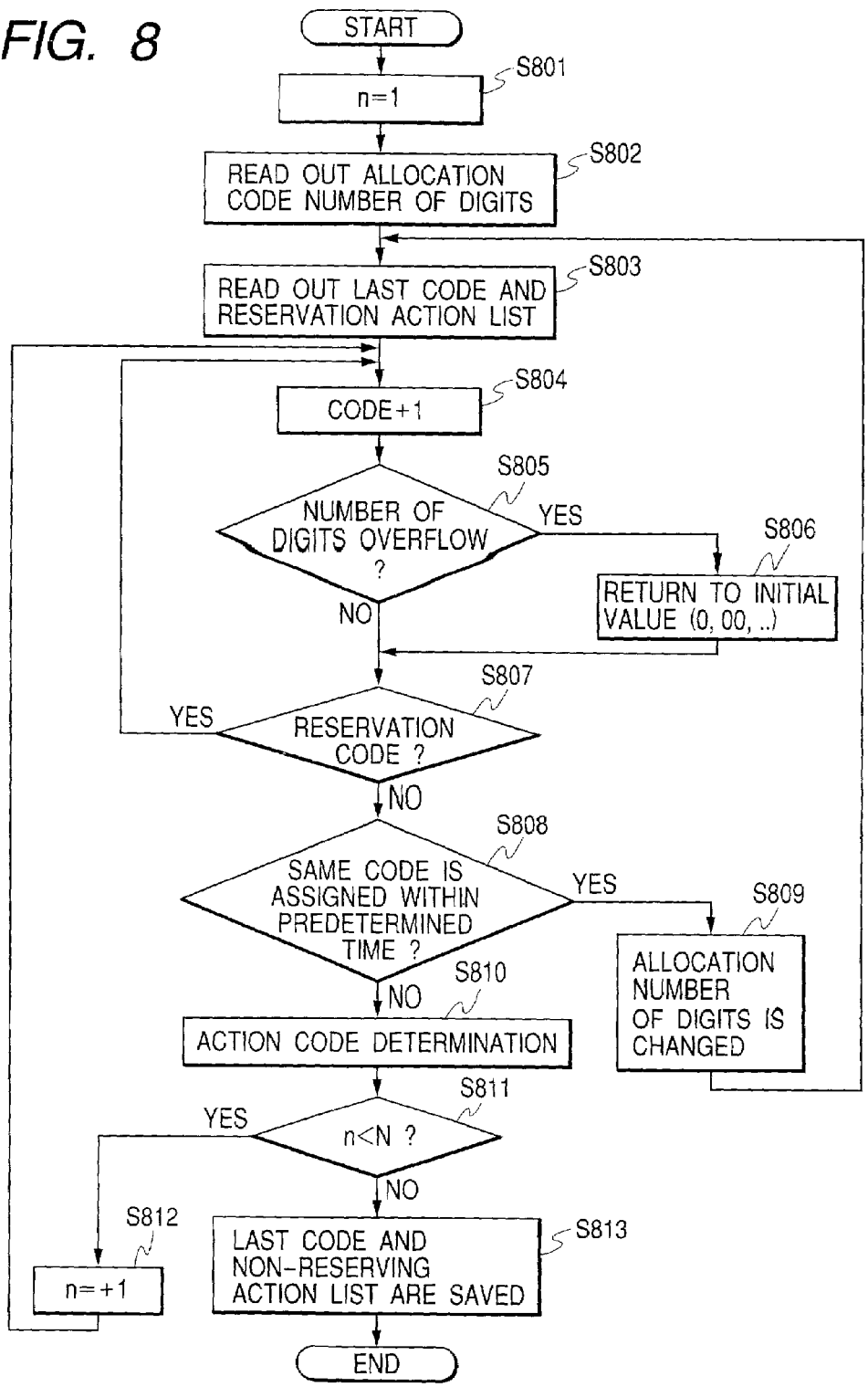
FIG. 8 is a flowchart showing the processing performed by the system controller when an action code is allocated for a non-reservation action.

FIG. 8 is a flowchart showing the processing performed by the system control unit 118 for allocating action code (allocating action code for a non-reservation action).

When an action code list is to be printed, the action code allocation process is begun, and at S801 "n" is set to "1" to provide a count of objects to which the action code is to be allocated.

The number of digits of the code for the non-reservation action, the last code allocated in the preceding action code allocation process, and the reservation action list are read from the hard disk 123 and are temporarily stored in the RAM of the system control unit 118 (S802 and S803). The number of digits of the code that is read is consonant with the number of the digits instructed by a user for action code list printing and set by the user for constant time printing, which will be described later.

At S804, the value of the last code read at S803 is incremented by one, and a check is performed to determine whether a carry has occurred (S805). In this case, a carry is indicated when for two digit code, for example, 99 is changed to 100. If a carry has occurred, a cumulative code value is returned to an initial value, such as 0, 00 or 000 (S806). Program control thereafter advances to S807.

At S807, the action code corresponding to the number obtained at S804 or S806 is compared with the action code on the reservation action code list read at S803 to determine whether the action code at S804 or S806 is a reservation code. When it is ascertained that the action code is a reservation code, program control returns to S804.

When the action code is not a reservation code, the date whereat the code corresponding to the number obtained at S804 or S806 was allocated is read from the reservation action list read at S803. The date is compared with the current date to determine whether the time difference between the two dates is shorter than a time set in advance (S808).

If the difference between the previous time, whereat the code was allocated, and the current time is less than the set time, the number of digits allocated for code is changed, and the digit count that is thereby obtained is temporarily stored in the RAM of the system control unit 118 (S809). Program control thereafter returns to S803. If, for example, the digit count obtained in the above manner is one to three, the number of digits allocated for code is incremented by one, whereas if the number of digits obtained is four, the number of digits allocated for code is decremented by one.

When the difference between the previous time, whereat the same code was allocated, and the current time is greater than the set time, the number obtained at S804 or S806 is determined to be action code (S810).

At S811, a check is performed to determine whether the count value n for action code allocation target objects equals the total number N for the action code allocation objects. When the count value n is less than the total number N, n is incremented by one (S812) and program control returns to S804. The total number N for the code allocation objects is the sum of the programs that are searched for in accordance with preferences expressed by the user, as will be described later.

When the count value n equals the total number N, the last determined action code is stored as last code on the hard disk 123, and the allocated action codes, together with the action label, the action function and the current date, are added to the non-reservation action list and stored on the hard disk (S813).

Figure 9:
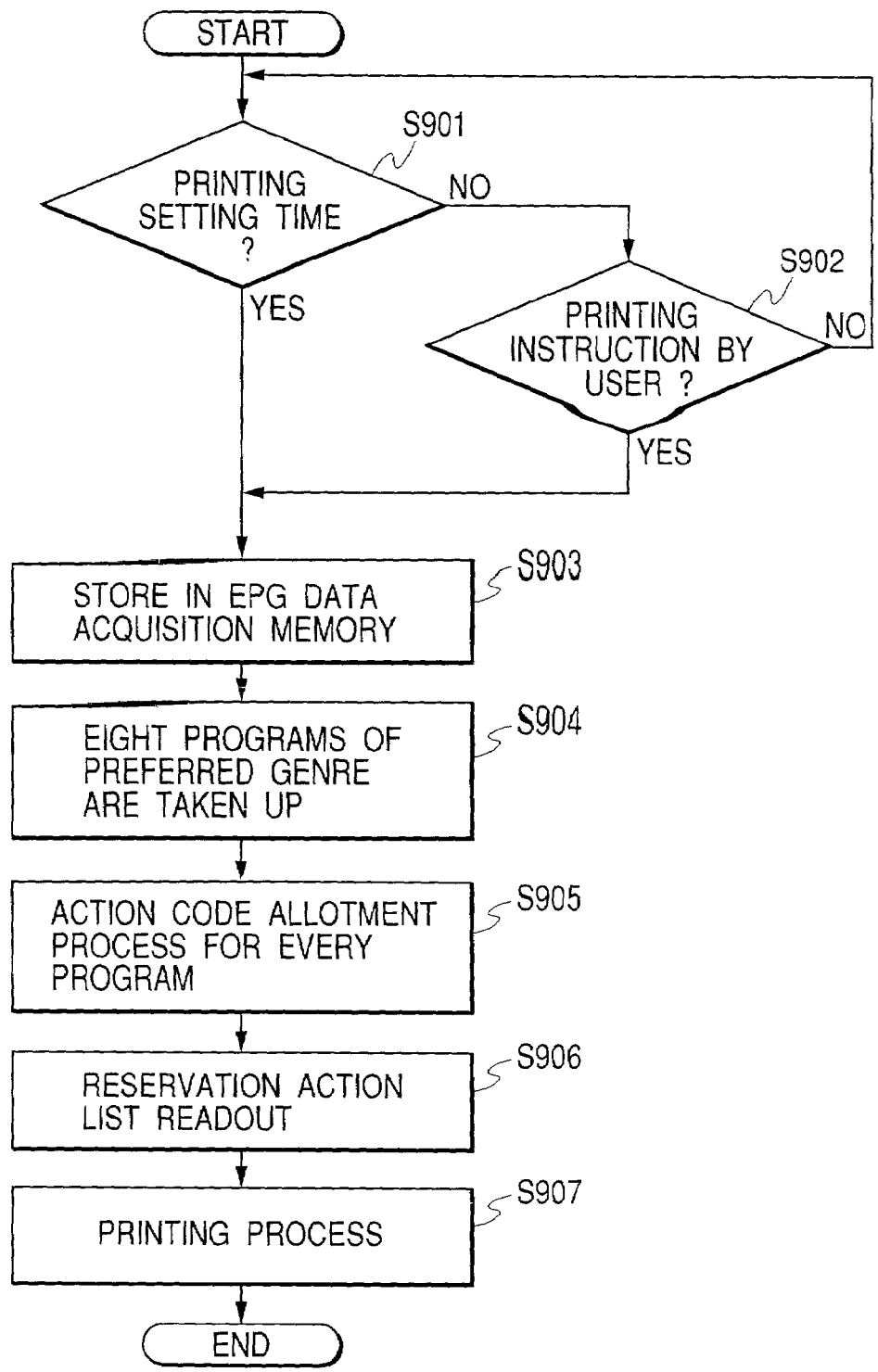
FIG. 9 is a flowchart showing the processing performed by the system controller when printing is initiated.

An explanation will now be given for the processing performed by the system control unit 118 for the printing of an action code list. FIG. 9 is a flowchart showing the printing processing performed by the system control unit 118.

At S901 a check is performed to determine whether a printing time has been reached. If the printing time has been reached, program control advances to S903. But when the printing time has not yet been reached, at S902 a check is performed to determine whether the user has issued a printing instruction, and if a printing instruction has been issued, program control advances to S903. It should be noted that the printing time can be set in advance for each user, and could be set for 6:00 daily, for example.

At S903, the tuner unit 101 is controlled to sequentially perform tuning, and the EPG data accumulated over the last 48 hours is obtained, via the descrambler 102 and the demultiplexer 103, and is temporarily stored in the RAM of the system control unit 118. The EPG data includes program names, program contents, genre information, broadcasting dates, channel numbers, transmission stream IDs and packet IDs. The EPG data obtained according to this embodiment is not limited to that accumulated within 48 hours but can be that accumulated within an arbitrary period of time.

At S904, a preferred program search is performed based on a search condition designated in advance by the user, and an action code is allocated for a program searched for in the above described manner and is, in addition, stored in the non-reservation action list, together with the action label "reservation", the action function "record reservation" and the action code allocation date (S905). It should be noted that the broadcasting time and channel number for a program, the transmission stream ID and a packet ID are set as arguments for the action function.

At S906, the reservation action list is read from the hard disk 123, and a predetermined action code, together with the action label, is output to the screen composition unit 108. Further, the name and the contents of the program found at S904 are extracted from the EPG data that is stored in the RAM of the system control unit 118 and, together with the action code and the action label allocated at S905, are output to the screen composition unit 108. The screen composition unit 108 prepares bitmap data for printing based on the action code, the action label and the program content data that are received, and outputs the bitmap data for printing via the IEEE1394 I/F 122.

In this embodiment, an action code for the reservation for recording of eight preferred programs obtained by a search and, from the reservation action list, action code relative to a reservation action other than program selection are printed.

FIG. 10 is a diagram showing an example printed action code list. The names of eight programs, their contents, broadcasting dates and channel numbers, and the action codes and action labels that are allocated for the programs are printed in the center. Action labels and action codes other than those on the reservation action list for channel selection are printed in the lower portion.

Figure 11:
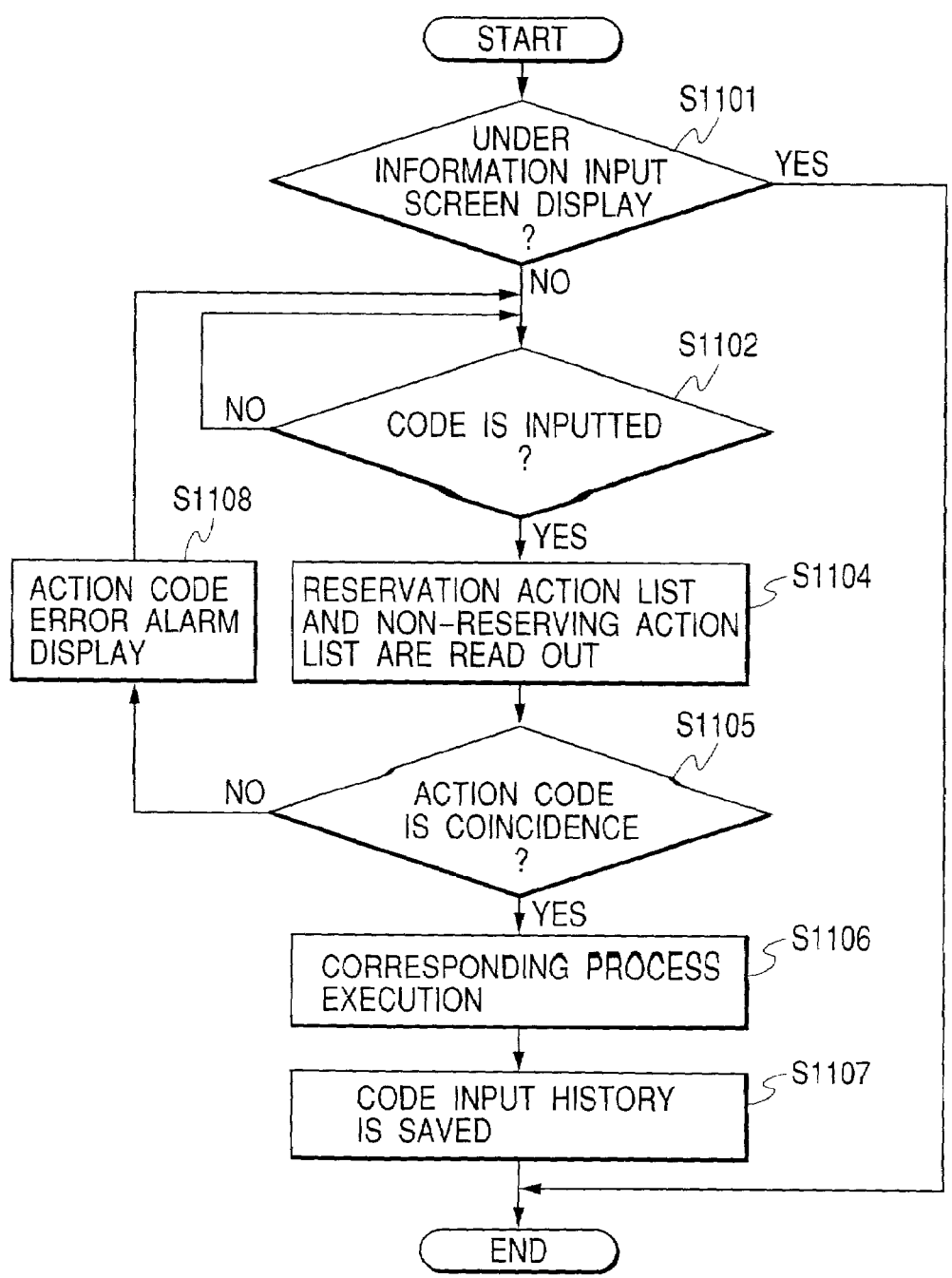
FIG. 11 is a flowchart showing the processing performed by the system controller when an action code is input.

The operation performed by the system control unit 118 upon the reception of an action code will now be described. FIG. 11 is a flowchart showing the processing performed by the system control unit 118 when the action code is received.

At S1101, a check is performed to determine whether a data input screen, such as a timer reservation setting screen or a personal data registration screen (neither shown), is displayed. If a data input screen is displayed, program control exits the flowchart in FIG. 11 and the ten key pad 205 is used as numerical input keys on the screen.

If no data input screen is displayed, at S1102 a check is performed to determine whether the action code has been entered. If the action code has been entered, the reservation action list and the non-reservation action list are read from the hard disk 123 and temporarily stored in the RAM of the system control unit 118 (S1104).

At S1105, a check is performed to determine whether an action for the action code that matches the numbers entered at S1102 is registered on the reservation action list, or whether the action is allocated on the non-reservation action list. If the action is allocated for the action code (S1106), the action code and data for the current date are stored as input history information on the hard disk 123 (S1107).

If the action is not allocated for the action code that matches the entered numbers, a message indicating that the input action code is incorrect is displayed (S1108) and program control returns to S1102.

As is described above, when the data input screen is not currently displayed on the image display unit 112, i.e., when the program is being viewed or the application is being executed as described above, the system control unit 18 performs an application corresponding to the entered action code.

The digital TV broadcast receiving apparatus 100 includes the extended card slot 124 and the digital photograph application, as described above, and can display, on the image display unit 112, an image captured by a digital camera.

Static images (JPEG format) and moving images (MPEG format) obtained by a digital camera are recorded on a memory card that is inserted into the extended card slot 124, and a non-reservation action list compatible with the memory card is also recorded.

The codes included in a non-reservation action list compatible with a memory card differ from those allocated for the above described non-reservation actions on the hard disk 123. For example, code 1000 1999 in the four-digit action codes is compatible with the memory card, and this code will not be used for an action code allocation process for a non-reservation action.

Figure 12B:
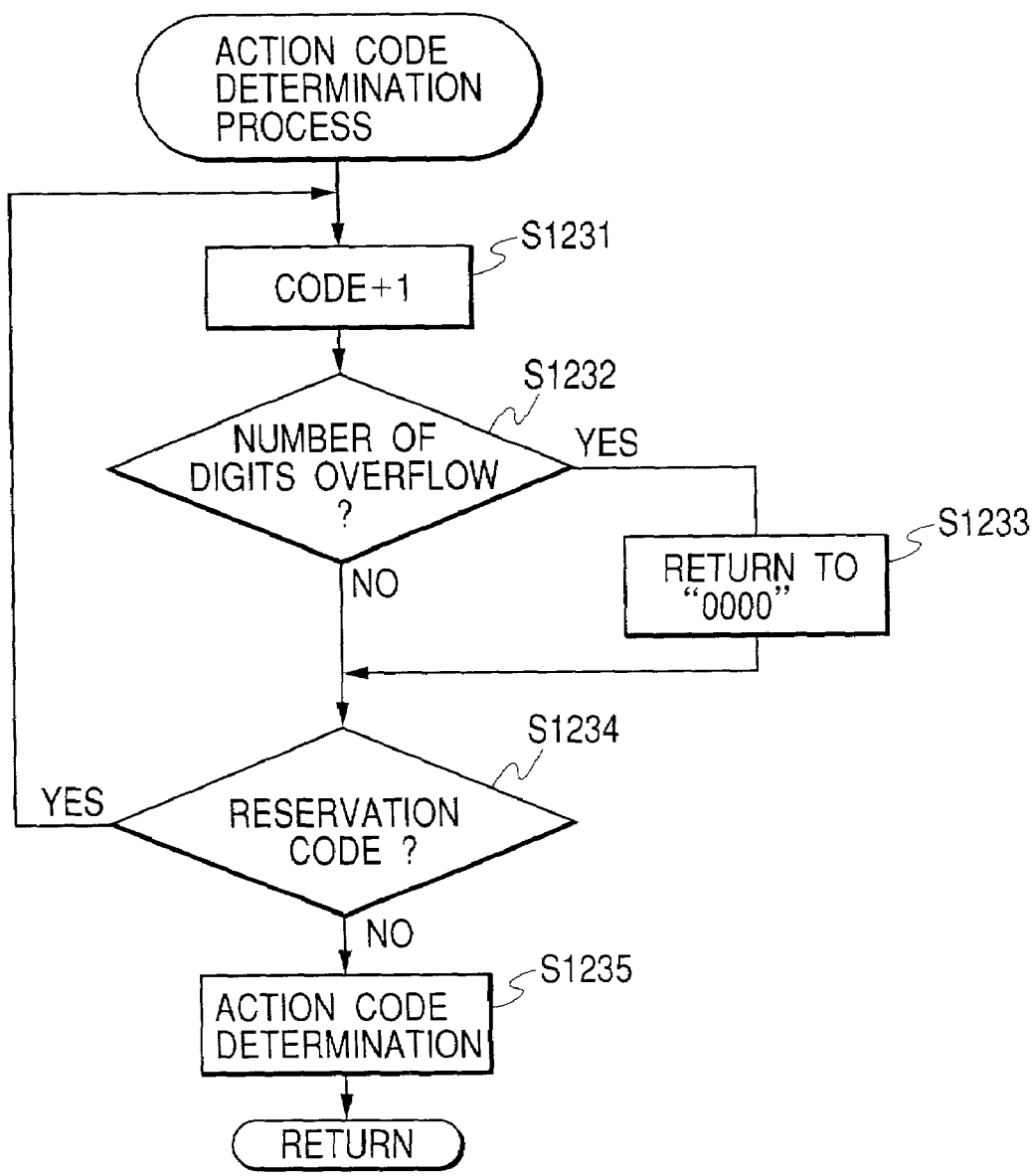

An explanation will now be given, while referring to flowcharts in FIGS. 12A and 12B, for the digital photo application and the action code allocation process and the printing process for a recorded image.

At S1201, a digital photograph recording is selected from the menu entries by using the menu key 207 or the cursor key 203 of the remote control unit 116, or the action code "22", for which, as shown in FIG. 10, the activation of the digital photograph application is allocated, is entered, thereby activating the digital photograph application.

At S1202, image data are read from the memory card inserted into the extended card slot 124, and a check is performed to determine whether there are newly obtained images. If there are newly obtained images, at S1203 the new images are displayed.

At S1204, the user deletes unnecessary images from the display of newly obtained images, and at S1205, a storage destination for the new images is selected. In this embodiment, the hard disk and the memory card can be selected as image storage areas.

At S1206, a check is performed to determine whether an instruction to print a thumbnail album of the new images has been issued by the user. If a printing instruction has been issued, at S1207 the selected storage area is identified. When the new images are stored on the hard disk, the non-reservation action list is read from the hard disk (S1208), and when the new images are stored on the memory card, the non-reservation action list is read from the memory card (S1209).

At S1210, for a specific image of the new images, the date that image was obtained, the image file name and the storage area address are read, the action code for the printing of the image is determined (S1211), and the action label "printing" and the action function "printing (file)" are allocated (S1212). The action code allocation process is performed at S1231 and S1235 in FIG. 12B in the same manner as described above.

At S1213, the action code for the image display operation is determined, and at S1214 the action label "display" and the action function "display (file)" are allocated.

At S1215, a check is performed to determine whether there is a relevant image. If a moving picture file having the same acquisition date as the specific image is recorded on the memory card, the pertinent image is determined to be an image relevant to the specific image. If no relevant image is found, program control advances to S1218.

If a relevant image is found, the action code for video reproduction is determined (S1216), and the action label "video" and the action function "video reproduction (file)" are allocated (S1217).

At S1218, the action codes, the action labels and the action functions, all of which are allocated at S1211 and S1217, are correlated with each other, and are stored on the non-reservation action list in the area wherein the new images are stored.

At S1219, a check is performed to determine whether the action code allocation process has been completed for all the new images that are stored. If the action code allocation process has not yet been completed, program control returns to S1210, and the action code allocation process for a new image is performed.

Figure 13:
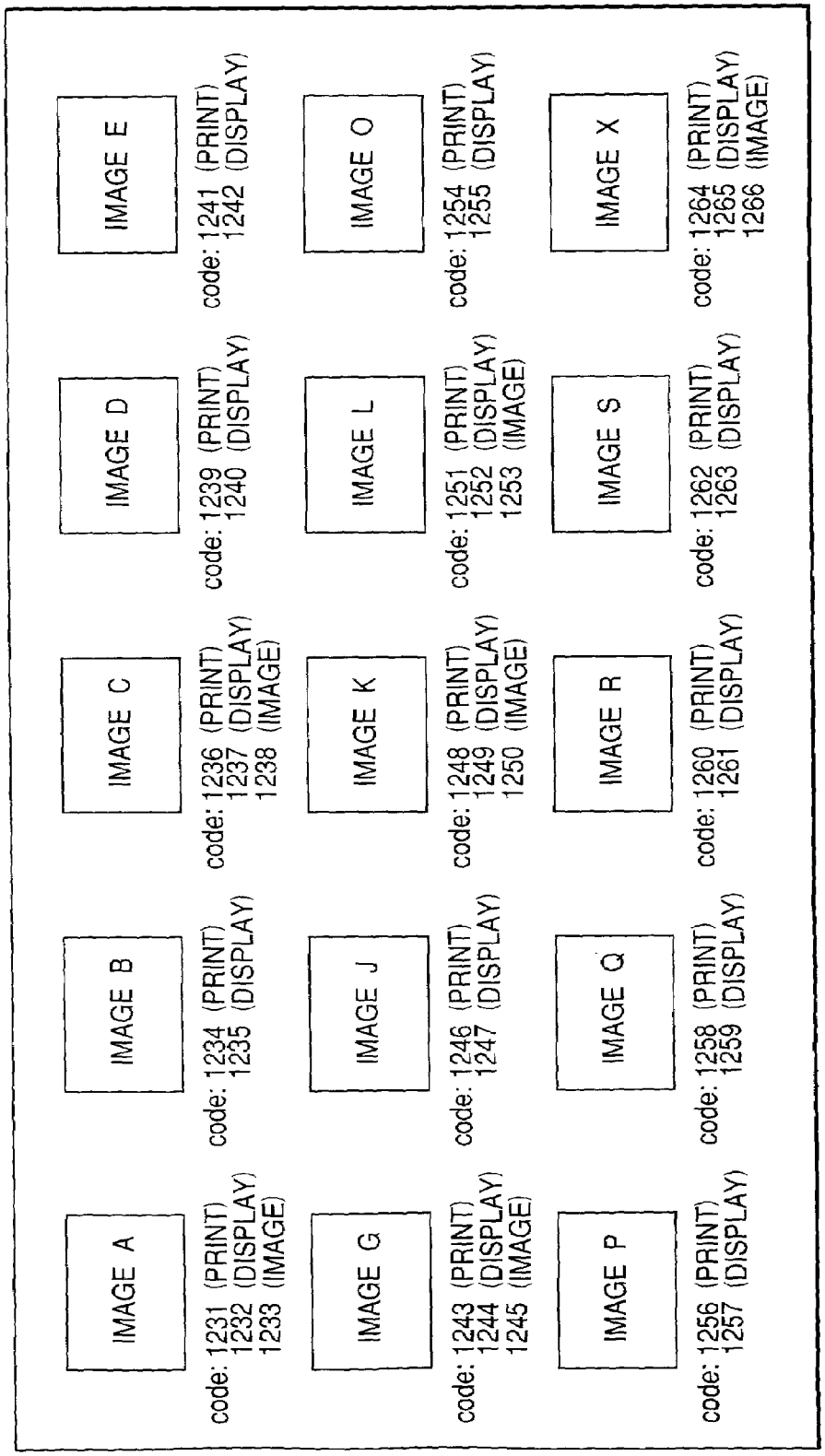
FIG. 13 is a diagram showing an example display for a list of images that are picked up and action codes that are allocated.

If the action code allocation process has been completed for all the new images that are stored, the data added to the non-reservation action list at S1218 are converted into bitmap data for printing, and the bitmap data are output to the printer 202, which prints the data (S1220). FIG. 13 is a diagram showing example printing results obtained in the above process. As is apparent from FIG. 13, when the thumbnail images for individual images are printed during the image printing process, the action codes are printed below and the action labels are printed adjacent to the action codes.

Since the operation of the system control unit 18 when an image display or image printing action code is input is the same as the flowchart in FIG. 11, an explanation for this operation will not be given.

For example, when the action code is allocated for each image, as is shown in FIG. 13, and when the user enters action code 1231, a corresponding action function "printing (a.jpg)" is performed, and image A is printed by the printer 202. Then, when the user enters action code 1232, a corresponding action function "display (a.jpg)" is performed, and image A is displayed on the image display unit 112. Subsequently, when the user enters action code 1233, a corresponding action function "video reproduction (a.mpg)" is performed, and a moving picture correlated with image A is displayed on the screen display unit 112.

As is described above, in this embodiment, in a digital TV broadcast receiving apparatus provided with a variety of function capabilities, such as WWW browsing software, data broadcast browsing software, an e-mail application and a digital photograph application, the codes for executing the individual functions are allocated to the respective functions, and instead of changing the codes, the same codes are consistently allocated for functions having a higher use frequency than others of the various available functions. Thus, a function required by a user can be easily and accurately performed.

In this embodiment, since the list of codes allocated to perform the functions is printed, a user can easily identify the code for a desired function, without performing a complicated operation or one that interferes with the viewing of a program that is being shown.

Furthermore, in this embodiment, since users sets the number of digits used for codes to be allocated for function, optimal codes can be provided for each user, and all users can use optimal operations to perform the individual functions available.

In this embodiment, one to four digits can be set for the number of digits used for an action code. However, the number of digits that can be used is not thereby limited, and an arbitrary number of digits can be employed.

Further, in this embodiment, the number of digits used for a reservation action code is manually set during the registration of the reservation action code. However, the number of digits for the reservation action code may be set in advance for each user, and during the registration of the reservation action code, a code choice to be allocated may be determined by entering a user ID.

In addition, in this embodiment, while the data input screen is displayed, the ten key pad 205 is used to enter numbers. A switch may be provided for alternating between an action code input mode, during which the ten key pad 205 is used to input action codes, and a normal mode, during which the ten key pad 205 is used for purposes other than entering action codes.

In this embodiment, the action code list is printed; however, the correlation table for the action codes and the allocation process may be displayed on the screen. In this case, the display screen may be divided into two areas, with the list displayed in one area, and the correlation of the action codes and the allocation process displayed in another part of the screen.

Although in this embodiment the IEEE1394 interface is used for the connection of an external device, another bus system or a network system may be employed.

The digital TV receiving apparatus of this embodiment includes a display unit and a loudspeaker; however, it may output a video signal and an audio signal to an external display device and an external loudspeaker.

Further, in this embodiment, the reception of television signals has been described. However, not only television signals, but also audio signals and data signals may be received that are transmitted via a network.

As is described above, according to the invention, since for users optimal codes are allocated for the functions of an apparatus having multiple functions, users can easily and accurately perform the operations corresponding to the functions.

Furthermore, according to the present invention, since for users optimal codes are allocated for the functions of digital TV broadcast receiving apparatuses having a variety of functions, a user can easily and accurately perform the operations corresponding to the functions, without interfering with the viewing of a program that is being shown.

What is claimed is:

1. A data processing apparatus comprising:
   a processing unit adapted to perform multiple processes;
   an allocation unit adapted to allocate predetermined codes to predetermined processes of the multiple processes, and to allocate codes other than the predetermined codes to processes of the multiple processes other than the predetermined processes thereof;
   a code input unit adapted to cause a user to input a code for performing a respective one of the processes;
   a control unit adapted to control said processing unit so as to perform the process corresponding to the code input by said code input unit; and
   an output unit adapted to output printing data, which indicates the codes allocated by said allocation unit, to a printer,
   wherein in accordance with a print instruction being provided by a user, or in accordance with reaching of a time set in advance, said allocation unit allocates codes other than the predetermined codes to the processes of the multiple processes other than the predetermined processes thereof, and said output unit outputs the printing data, which indicates the codes allocated by said allocation unit, to the printer.

2. An apparatus according to claim 1, wherein the predetermined processes of the multiple processes include at least one of a sending and receiving process of electronic mail data and a World Wide Web browsing process.

3. An apparatus according to claim 1, further comprising a receiving unit adapted to receive a television signal, wherein the processes of the multiple processes other than the predetermined processes thereof include a recording scheduling process of each of a plurality of programs transmitted on the television signal.

4. An apparatus according to claim 3, further comprising a searching unit adapted to search a program on a plurality of programs transmitted on the television signal, in accordance with a predetermined search condition, wherein the processes of the multiple processes other than the predetermined processes thereof include a recording scheduling process of the program searched by said searching unit.

5. A data processing method for data processing apparatus having multiple functions, said method comprising the steps of:
   a processing step of performing multiple processes;
   an allocating step of allocating predetermined codes to predetermined processes of the multiple processes, and allocating codes other than the predetermined codes to processes of the multiple processes other than the predetermined processes thereof;
   a code inputting step of causing a user to input a code for performing a respective one of the processes;
   a control step of controlling said processing step so as to perform the process corresponding to the code input in said code inputting step; and
   an outputting step of outputting printing data, which indicates the codes allocated in said allocating step, to a printer,
   wherein in accordance with a print instruction being provided by a user, or in accordance with reaching of a time set in advance, said allocating step allocates codes other than the predetermined codes to the processes of the multiple processes other than the predetermined processes thereof, and said output step outputs the printing data, which indicates the codes allocated in said allocation step, to printing means.

6. A method according to claim 5, wherein the predetermined processes of the multiple processes include at least one of a sending and receiving process of electronic mail data and a World Wide Web browsing process.

7. A method according to claim 5, further comprising a receiving step of receiving a television signal, wherein the processes of the multiple processes other than the predetermined processes thereof include a recording scheduling process of each of a plurality of programs transmitted on the television signal.

8. A method according to claim 7, further comprising a searching step of searching a program on a plurality of programs transmitted on the television signal, in accordance with a predetermined search condition, wherein the processes of the multiple processes other than the predetermined processes thereof include a recording scheduling process of the program searched in said searching step.

9. A data processing apparatus comprising:
   processing means adapted to perform multiple processes;
   allocation means adapted to allocate predetermined codes to predetermined processes of the multiple processes, and to allocate codes other than the predetermined codes to processes of the multiple processes other than the predetermined processes thereof;

code input means adapted to cause a user to input a code for performing a respective one of the processes;

control means adapted to control said processing means so as to perform the process corresponding to the code input by said code input means; and output means adapted to output printing data, which indicates the codes allocated by said allocation means, to a printer, wherein in accordance with a print instruction being provided by a user, or in accordance with reaching of a time set in advance, said allocation means allocates codes other than the predetermined codes to the processes of the multiple processes other than the predetermined processes thereof, and said output means outputs the printing data, which indicates the codes allocated by said allocation means, to the printer.

10. An apparatus according to claim 9, wherein the predetermined processes of the multiple processes include at least one of a sending and receiving process of electronic mail data and a World Wide Web browsing process.

11. An apparatus according to claim 9, further comprising receiving means adapted to receive a television signal, wherein the processes of the multiple processes other than the predetermined processes thereof include a recording scheduling process of each of a plurality of programs transmitted on the television signal.

12. An apparatus according to claim 11, further comprising searching means for searching a program on a plurality of programs transmitted on the television signal, in accordance with a predetermined search condition, wherein the processes of the multiple processes other than the predetermined processes thereof include a recording scheduling process of the program searched by said searching means.

* * * * *